(12) United States Patent
Udo

(10) Patent No.: US 11,784,966 B2
(45) Date of Patent: Oct. 10, 2023

(54) INFORMATION PROCESSING DEVICE, CONTROL METHOD FOR INFORMATION PROCESSING DEVICE, AND RECORDING MEDIUM, THAT SUPPRESS DUPLICATION OF A DEVICE NAME IN A DNS SERVER

(71) Applicant: CANON KABUSHIKI KAISHA, Tokyo (JP)

(72) Inventor: Hayato Udo, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/526,234

(22) Filed: Nov. 15, 2021

(65) Prior Publication Data
US 2022/0158969 A1 May 19, 2022

(30) Foreign Application Priority Data
Nov. 19, 2020 (JP) .................................. 2020-192604

(51) Int. Cl.
*H04L 61/4511* (2022.01)
*H04L 61/5069* (2022.01)

(52) U.S. Cl.
CPC ...... *H04L 61/4511* (2022.05); *H04L 61/5069* (2022.05)

(58) Field of Classification Search
CPC .............. H04L 61/4511; H04L 61/5069; H04L 61/4541; H04L 61/3005
See application file for complete search history.

(56) References Cited

U.S. PATENT DOCUMENTS

| 6,985,242 B1* | 1/2006 | Toyoda | H04N 1/00214 379/100.09 |
| 7,797,410 B2* | 9/2010 | Westerdal | H04L 61/4511 709/245 |
| 2003/0126241 A1* | 7/2003 | Nagura | H04L 61/45 707/999.107 |

(Continued)

FOREIGN PATENT DOCUMENTS

JP 2019057906 A 4/2019

OTHER PUBLICATIONS

Cheshire. "DNS-Based Service Discovery." [online], Feb. 2013. Internet Engineering Task Force (IETF).

*Primary Examiner* — Jimmy H Tran
(74) *Attorney, Agent, or Firm* — ROSSI, KIMMS & McDOWELL LLP

(57) ABSTRACT

An information processing device that is connected to a DNS server via a network in which the information processing device and the DNS server can communicate with each other comprising: a first confirmation unit that confirms if there is a duplication of a device name of the information processing device within the same local area network; a second confirmation unit that confirms if the device name of the information processing device is a duplicate of a device name registered in the DNS server if it is confirmed there is no duplication of the device name of the information processing device within the same local area network; and a registration unit that registers the device name of the information processing device in the DNS server if it is confirmed that the device name of the information processing device is not a duplicate of the device name registered in the DNS server.

12 Claims, 7 Drawing Sheets

(56) References Cited

U.S. PATENT DOCUMENTS

| | | | | |
|---|---|---|---|---|
| 2004/0044791 A1* | 3/2004 | Pouzzner | G06F 16/9566 | 707/E17.115 |
| 2004/0083306 A1* | 4/2004 | Gloe | H04L 61/5038 | 707/999.107 |
| 2004/0095962 A1* | 5/2004 | Ohta | H04L 61/4511 | 370/389 |
| 2004/0148398 A1* | 7/2004 | Park | H04L 61/5046 | 709/227 |
| 2005/0086377 A1* | 4/2005 | Aso | H04L 61/4511 | 358/1.15 |
| 2006/0064397 A1* | 3/2006 | Ohtani | H04N 1/00204 | |
| 2006/0192994 A1* | 8/2006 | Tanimoto | H04L 61/4511 | 358/1.15 |
| 2007/0011354 A1* | 1/2007 | Ohara | G06F 3/1222 | 340/9.1 |
| 2007/0230463 A1* | 10/2007 | Shima | H04L 43/0817 | 370/503 |
| 2009/0222566 A1* | 9/2009 | Murakami | H04L 67/303 | 709/229 |
| 2010/0211878 A1* | 8/2010 | Spijkerbosch | H04L 41/0809 | 709/222 |
| 2011/0010413 A1* | 1/2011 | Christenson | H04L 61/4511 | 709/203 |
| 2011/0106919 A1* | 5/2011 | Mazur | H04L 61/4511 | 709/245 |
| 2013/0250358 A1* | 9/2013 | Suzuki | H04L 65/1069 | 358/1.15 |
| 2015/0052231 A1* | 2/2015 | Sun | H04L 41/0803 | 709/223 |
| 2015/0127806 A1* | 5/2015 | Zizlavsky | H04L 41/0873 | 709/224 |
| 2015/0341308 A1* | 11/2015 | Hansen | H04L 61/5076 | 709/223 |
| 2015/0370866 A1* | 12/2015 | Schneider | G06F 16/248 | 707/706 |
| 2016/0173519 A1* | 6/2016 | Davis | H04L 63/1425 | 726/23 |
| 2017/0041292 A1* | 2/2017 | Stern | H04L 63/1466 | |
| 2017/0195285 A1* | 7/2017 | Kakhki | H04L 61/4511 | |
| 2017/0300277 A1* | 10/2017 | Kosuda | H04L 61/4511 | |
| 2018/0004457 A1* | 1/2018 | Morita | G06F 3/1237 | |
| 2018/0309712 A1* | 10/2018 | Jeong | H04L 61/3025 | |
| 2021/0400061 A1* | 12/2021 | Antoniewicz | H04L 61/4511 | |

\* cited by examiner

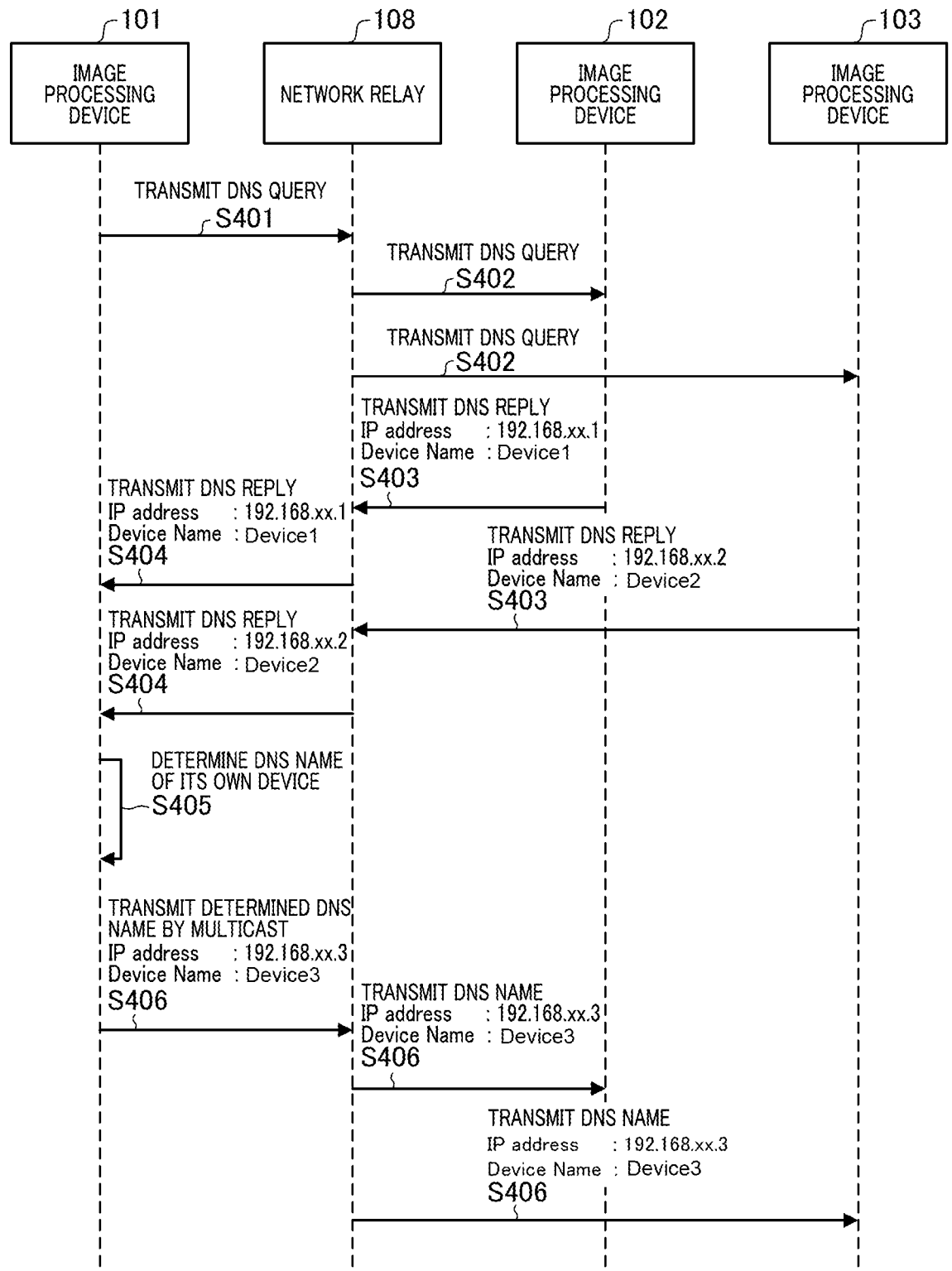

INFORMATION PROCESSING DEVICE, CONTROL METHOD FOR INFORMATION PROCESSING DEVICE, AND RECORDING MEDIUM, THAT SUPPRESS DUPLICATION OF A DEVICE NAME IN A DNS SERVER

BACKGROUND OF THE INVENTION

Field of the Invention

The present invention relates to an information processing device, a control method for the information processing device, and a recording medium.

Description of the Related Art

A Dynamic Domain Name System (DDNS) is a common networking technique. This is a mechanism in which an IP address dynamically assigned to an information processing device is dynamically registered to a DNS server each time, and access by a domain name, which is a fixed value, is enabled. This DDNS is a widely used technique ranging from intra-organization local area network (LAN) to wide area network (WAN).

In recent years, a Multicast Domain Name System (mDNS) technique using multicast has been used in corporate offices and commercial facilities. mDNS is a mechanism that enables name resolution in device search for devices within a local area network without a DNS server. Japanese Patent Application Laid-Open No. 2019-57906 discloses an information processing device in which, when a sub-controller receives an mDNS query packet in sleep mode, the sub-controller responds (proxy response) in sleep mode without returning to a normal mode. By using mDNS, a device can avoid the duplication of a device name (DNS name) within the same local area network.

However, in mDNS, if another device outside the local area network has already registered the same DNS name in the DNS server, duplicate device names can be registered. That is, it is impossible to avoid the registration of duplicate device names in a DNS server beyond the local area network even if mDNS is used to attempt to avoid the registration of duplicate device names.

A technique referred to as "Domain Name System Service Discovery (DNS-SD)" has also begun to be used as a mechanism for name resolution beyond the local area network. S. Cheshire, M. Krochmal, "DNS-Based Service Discovery", [online], February, 2013, Internet Engineering Task Force (IETF), the Internet, <URL:https://www.ietforg/rfc/rfc6763.txt> discloses a technique in which an information processing device that performs the registration of information such as an interface name and device information in a DNS record requests the name of an information processing device that has already been registered and acquires information such as an IP address. The use of DNS-SD enables device search beyond the local area network. When the device registers its own device information in a DNS server, the duplication of a device name (DNS name) is a concern because, in many cases, a duplicate registration guard for avoiding the registration of duplicate device names is not set in a typical DNS server. Due to the duplication of device names, devices having the same name are displayed during a device search, which thereby confuses the user.

SUMMARY OF THE INVENTION

The present invention provides an information processing device that suppresses the duplication of a DNS name when a device is registered in a DNS server.

The information processing device of the present invention is an information processing device that is connected to a DNS server via a network in which the information processing device and the DNS server can communicate with each other comprising: a first confirmation unit that confirms whether or not a device name of the information processing device has been duplicated within the same local area network; a second confirmation unit that confirms whether or not the device name of the information processing device is a duplicate of a device name registered in the DNS server if it is confirmed that the device name of the information processing device has not been duplicated within the same local area network; and a registration unit that registers the device name of the information processing device in the DNS server if it is confirmed that the device name of the information processing device is not a duplicate of the device name registered in the DNS server.

Further features of the present invention will become apparent from the following description of exemplary embodiments with reference to the attached drawings.

BRIEF DESCRIPTION OF THE DRAWINGS

FIG. 4 is a sequence diagram of device registration using mDNS.

DESCRIPTION OF THE EMBODIMENTS

Figure 1:
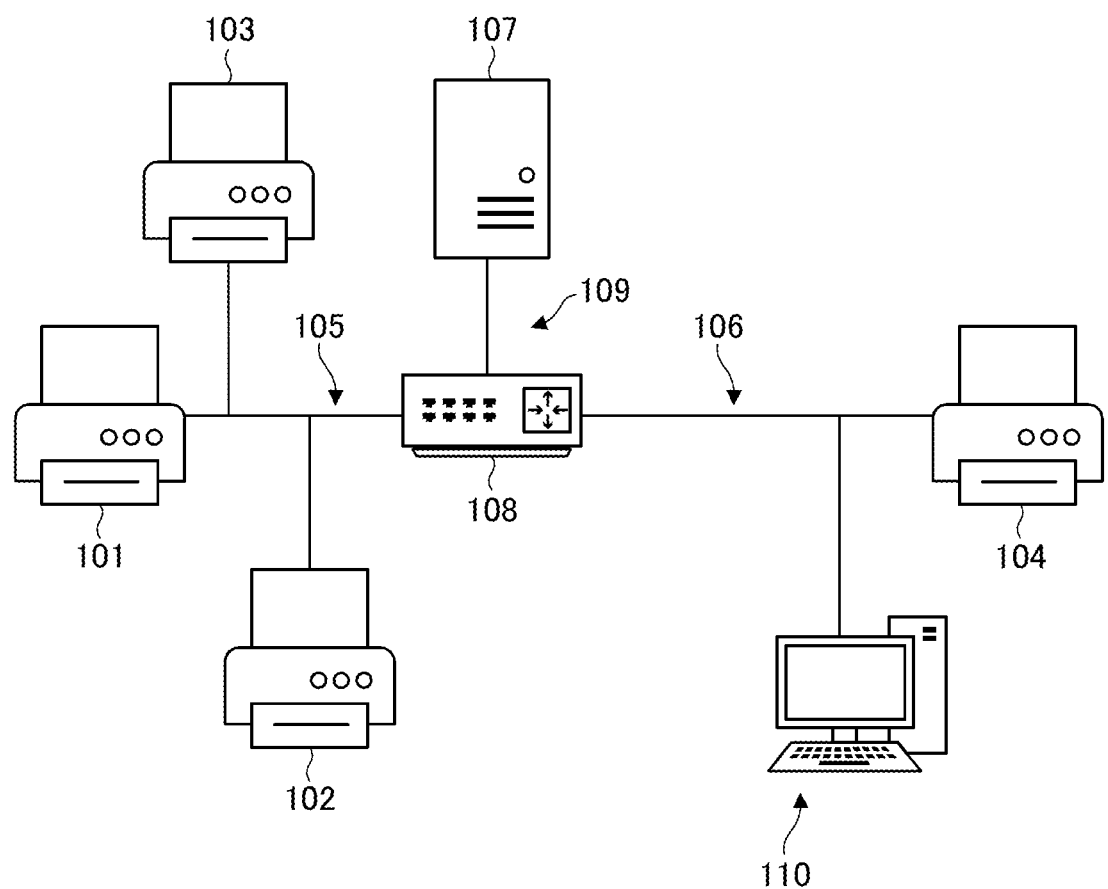
FIG. 1 illustrates a configuration of a network system.

FIG. 1 illustrates a configuration of a network system in the present embodiment. The network system includes a DNS server 107 and an information processing device connected to the DNS server 107 via a network that are capable of communication with each other. In the present embodiment, image processing devices (an image processing device 101 to an image processing device 104) will be described as one example of the information processing device connected to the DNS server 107 that is capable of communication. The network system of the present embodiment includes the image processing device 101, the image processing device 102, the image processing device 103, the image processing device 104, the information processing device 110, the DNS server 107, a network relay 108, and a network 109. The network 109 also includes a first subnet 105 and a second subnet 106.

The network 109 is referred to as a communication network achieved by, for example, a LAN and a WAN such as the Internet, a telephone line, a dedicated digital line, a cable television line, a wireless line for data broadcasting and the like, or a combination thereof. The network 109 connects the DNS server 107 and the network relay 108, connects the image processing device 101 to the image processing device 103, and the network relay 108, and connects the image processing device 104, the information processing device 110, and the network relay. The network connecting the image processing device 101, the image processing device 102, the image processing device 103, and the network repeater 108 is defined as a first subnet 105. The network connecting the image processing device 104, the information processing device 110, and the network relay 108 is defined as a second subnet 106.

The image processing device 101, the image processing device 102, the image processing device 103, and the image processing device 104 are, for example, MFPs (multifunction peripherals) having multiple functions including a printing function and a scanning function. In printing, an image is output to a sheet, for example, paper, based on a print job received from an external device. In scanning, an original is read, and image data is generated. The image processing device 101, the image processing device 102, the image processing device 103, and the image processing device 104 have an mDNS (Multicast Domain Name System) function. The mDNS function will be described below.

The information processing device 110 is a computer device operated by a user, and the examples of the information processing device include a PC (personal computer), a smartphone, and a tablet terminal. The information processing device 110 is a device on the second subnet 106 and is connected to the network relay 108 and the image processing device 104 by the second subnet 106. The information processing device 110 has a print module for providing a printing instruction to the image processing device. For example, the information processing device 110 searches for the image processing device 104 having a printing function from among the devices belonging to the second subnet 106 by using mDNS and acquires an IP address from the image processing device 104. The information processing device 110 specifies the acquired IP address and transmits a print job for instructing execution of printing to the image processing device 104.

The image processing device 101, the image processing device 102, and the image processing device 103 exist on the first subnet 105 that is a local area network assigned by the network relay 108. The image processing device 104 and the information processing device 110 exist on the second subnet that is a local area network different from the first subnet 105, assigned by the network relay 108.

The network relay 108 is connected to the DNS server 107 and relays the DNS server 107 and devices on each local area network (first subnet 105 and second subnet 106). Devices (the image processing device 101 to the image processing device 104, and the information processing device 110) on the first subnet 105 or the second subnet 106 can access the DNS server 107 via the network relay 108.

The DNS (Domain Name System) server 107 receives the registration of devices on the network 109 and manages a DNS record. The DNS record is data in which a device name (also referred to as a "DNS name") indicating a device is associated with an IP address. Details of the DNS record will be described below with reference to FIG. 3A and FIG. 3B. The DNS server 107 receives a query from the devices on the network 109 via the network 109 and the network relay 108 and transmits a response to the query. The DNS server 107 may be implemented by a virtual machine (cloud service) using a resource provided from a data center including a server device, in addition to the server device.

The mDNS function of the image processing device 101, the image processing device 102, the image processing device 103, and the image processing device 104 will now be described. In general, name resolution in the same subnet can be performed by using the mDNS function. A multicasting query is transmitted to all the devices in the local area network by the mDNS function, the reply is received therefrom, and the DNS name and the IP address within the local area network can thereby be determined in the DNS server 107 without duplication.

A specific example of the mDNS function in the present embodiment will be described mainly with reference to the image processing device 101. The image processing device 102, the image processing device 103, and the image processing device 104 have the same functions as the image processing device 101. The image processing device 101 having the mDNS function transmits a DNS query to all the devices on the same subnet, that is, all the devices existing on the first subnet 105, and returns a response when a DNS query is transmitted from another device. Further, the image processing device 101 transmits a DNS record to the DNS server 107, registers its own device in the DNS server 107, and acquires a DNS record of a device registered in the DNS server 107 from the DNS server 107.

Additionally, the image processing device 101 announces the information about its own device to all the devices existing on the first subnet 105. The announcement of the information about its own device is executed by the image processing device 101 by sharing a DNS record including an SRV (Service) record, a TXT record, a PTR record and the like with a terminal in the same subnet.

That is, the image processing device 101 transmits the query to all the devices existing on the first subnet 105 through mDNS and receives the device information including the DNS name as a response for the query. Then, the image processing device 101 acquires the DNS names of the devices (for example, the image processing device 102 and the image processing device 103) existing on the first subnet 105 based on the acquired identification information and compares the DNS names with the DNS name of its own device. Thus, the image processing device 101 can confirm whether or not the DNS name is duplicated with the DNS names of the devices on the same subnet.

The announcement of a device name using mDNS cannot cross subnets. Accordingly, in mDNS, only confirmation of a duplicate name within the same subnet is possible, and in registering a device name in the DNS server beyond the subnet, the duplication of device names cannot be avoided if a duplicate guard is not provided to the DNS server. In many cases, a duplicate guard is not provided to the DNS server, and when a duplicate guard is not provided, a name that is a duplicate of a device name of a device outside of the subnet may be registered.

In this context, DNS-SD (Domain Name System Service Discovery) exists as a mechanism for name resolution beyond a subnet. In DNS-SD, a device that needs to announce its own DNS name first describes information such as an interface name and device information in a DNS record, and then registers the DNS record in the DNS server. The DNS server manages the DNS record that has been transmitted from the device. A PC searching for a device requests the registered device name from the DNS server. The PC can acquire the device name from the DNS server and acquire an IP address corresponding to the device name based on the acquired device name (name resolution).

When an external PC or the like accesses the DNS server 107 to search for the image processing device in a case where the DNS name that is the same as the DNS name of the image processing device 101 has been registered in the DNS server 107, a plurality of image processing devices having the same device name is searched. Since a user cannot distinguish which is the desired image processing device, the user may be confused.

Hence, when the image processing device 101 registers its own device name in the DNS server 107, it is necessary to prevent the device name from duplicating a device name that is already registered in the DNS server 107. At this time, it is necessary for the image processing device 101 to prevent the device name from duplicating not only the device name of an information processing device existing on the first subnet 105 but also the device name of an information processing device existing on the second subnet 106.

Figure 2:
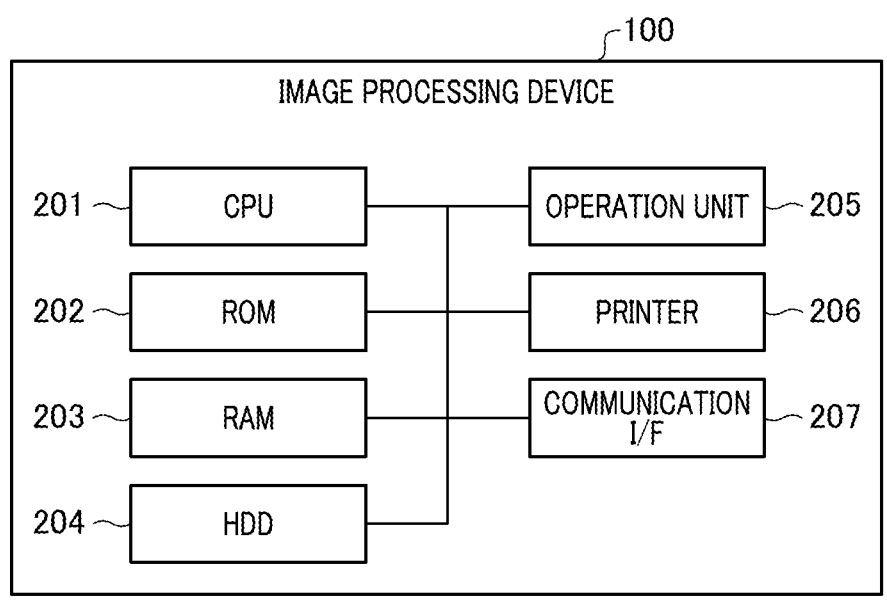
FIG. 2 illustrates a hardware configuration of an image processing device.

FIG. 2 illustrates a hardware configuration of the image processing device 101. The image processing device 102, the image processing device 103, and the image processing device 104 have the same configuration as the image processing device 101. The image processing device 101 includes a CPU 201, a ROM 202, a RAM 203, an HDD 204, an operation unit 205, a printer 206, and a communication I/F 207.

The CPU (Central Processing Unit) 201 controls the entire terminal device. The CPU 201 executes an OS (operating system), application programs, and the like stored in the RAM 203 or the HDD 204. That is, the CPU 201 executes a program stored in a readable storage medium, and each processing unit thereby functions to execute a process to be described below.

The RAM (Random Access Memory) 203 is a volatile storage area and is used as a temporary storage region and a work area when the CPU 201 performs various processes. The CPU 201 deploys various control programs stored in the ROM 202 and the HDD 204 into the RAM 203. The ROM (Read Only Memory) 202 is a nonvolatile storage region and stores various data such as a basic control program of the image processing device 101, an OS (Operating System), and an application. The basic control program includes a boot program. The CPU 201 executes a boot program stored in the ROM 202 when the image processing device 101 is activated. The boot program reads the OS program and deploys it on the RAM 203. Subsequently, the CPU 201 executes the OS program deployed on the RAM 203 and controls the image processing device 101.

The HDD (Hard Disc Drive) 204 is a storage means and a mass storage unit that stores image data and various programs. Although, in the present embodiment, the HDD 204 has been described as an example of the storage means, the present invention is not limited thereto, and an SSD (Solid State Drive) may be used, or a device in which an external medium such as a memory card is mounted, and data can be read/written may be used.

In the present embodiment, although each of the processes shown in the flowchart to be described below is executed by one CPU 201, another embodiment may be used. For example, a plurality of CPUs, microprocessors (MPU), and a plurality of RAMs or HDDs may cooperate to execute each process shown in the flowchart to be described below. Additionally, a part of the processes to be described below may be executed by using a hardware circuit. Examples of the hardware circuit include ASICs (Application Specific Integrated Circuits) and FPGAs (Field-Programmable Gate Arrays).

The operation unit 205 includes a display device and an input device, displays various information to the user, and receives an operation/input/instruction from the user. The display device is, for example, a liquid crystal display or a touch panel. The input device is, for example, a pointing device (for example, a touch pad or a touch panel), an operation button, or a keyboard. In the present embodiment, a case in which the image processing device 101 is provided with a touch panel serving as the operation unit 205 will be described as an example. A GUI can be configured in such a way that the user can directly operate the screen displayed on the touch panel by associating the input coordinates and the display coordinates on the touch panel. On a user interface screen displayed on the touch panel, the user provides an instruction about the execution of a job and the like to the image processing device 101.

The printer 206 is an image output device that forms an image in accordance with print data received externally via the communication I/F 207 and outputs the image to a sheet or optically outputs an original image set in a scanner to a sheet for reading. The communication I/F 207 is a network interface for connecting to the Internet and a LAN (Local Area Network) of an office. In the present embodiment, the communication I/F 207 connects the image processing device 101 to the first subnet 105.

Figure 3A:
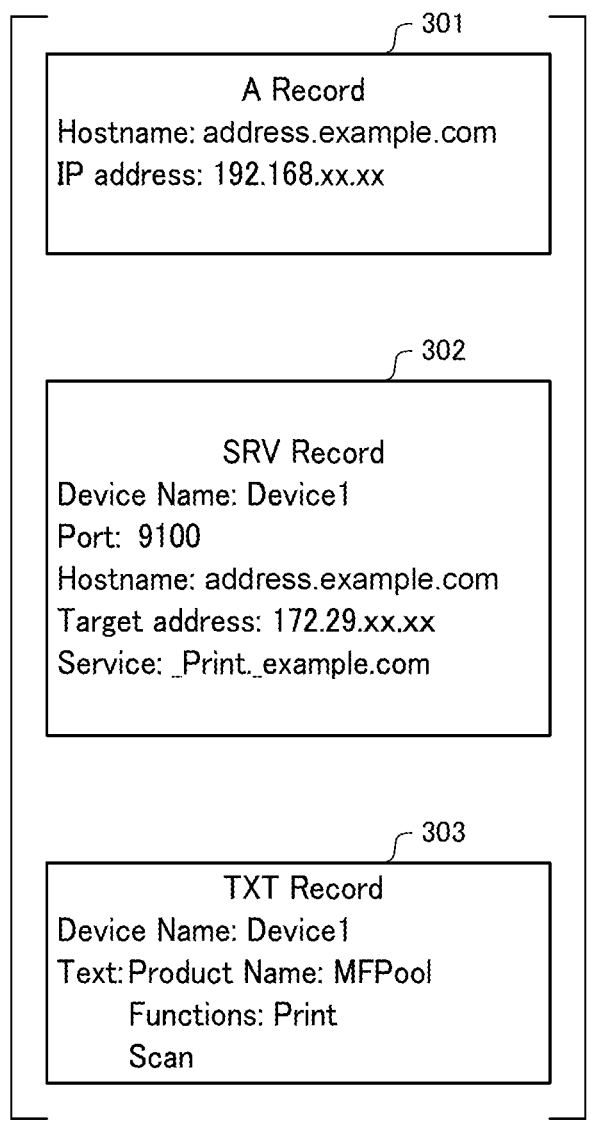
FIGS. 3A and 3B illustrate one example of various DNS records.
Figure 3B:
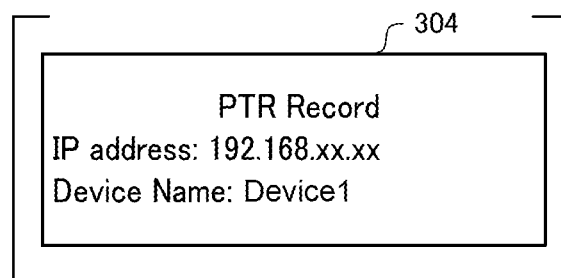

FIG. 3A and FIG. 3B illustrate an example of a DNS record. FIG. 3A is an example of the DNS record that is transmitted when the device registers its own device in the DNS server 107. The image processing device 101 registers the information including the DNS name of its own device in the DNS server 107 in the form of a DNS record. For example, the image processing device 101 transmits an A record 301, an SRV record 302, and a TXT record 303 to the DNS server 107 as the DNS record.

The image processing device 101 first registers the A record 301 in the DNS server 107. The A record 301 includes the IP address and the host name of the image processing device 101. The image processing device 101 generates the A record 301 in which the IP address and the host name of its own device are described and transmits the A record 301 to the DNS server 107.

Next, the image processing device 101 registers the SRV record 302 in the DNS server 107. The SRV record 302 includes the DNS name and a port number of the image processing device 101. In FIG. 3A, the DNS name is a device name. Additionally, the SRV record 302 may include a host name, a target address, a service name, a weight, and a priority. The first image processing device generates an SRV record in which the DNS name of its own device and the port number used for communication are described and transmits the SRV record to the DNS server 107.

Next, the image processing device 101 registers the TXT record 303 in the DNS server 107. TXT record 303 includes information about the device, for example, a product name and a function. For example, a product name is described as the product name, and functions such as printing and scanning that can be executed by the image processing device 101 are described as the function. The image processing device 101 generates the TXT record 303 in which information about its own device is described and transmits the TXT record 303 to the DNS server 107. The DNS server 107 registers and manages the DNS record that has been transmitted from the image processing device 101.

Next, a case in which the information processing device 110 sends a request about the image processing device 101 to the DNS server 107 will be described. FIG. 3B is an example of a record generated as a response for the DNS query. First, the information processing device 110 transmits the DNS query to the DNS server 107 and requests a PTR record group. A PTR record 304 is a DNS record for specifying a device name based on an IP address and includes an ID address and a device name that is a DNS name. The DNS server 107 generates a PTR record corresponding to the image processing device registered in the DNS server 107 as a response for the DNS query and returns the PTR record to the information processing device 110. The information processing device 110 acquires a list of devices registered in the DNS server 107 by receiving the PTR record from the DNS server 107. Next, the information processing device 110 transmits a query for requesting the SRV record 302 and the TXT record 303 corresponding to each image processing device to the DNS server 107. The DNS server 107 that has received the query responds the SRV record 302 and the TXT record 303 that have been requested to the information processing device 110. Subsequently, the image processing device 101 acquires information about the IP address, the port number related to each image processing device, and the product name of the image processing device from the contents described in the SRV record 302 and the TXT record 303 that have been acquired from the DNS server 107.

There is a mDNS (Multicast DNS) using multicast as a system for avoiding duplicate registration of the DNS name (device name) within the local area network. The mDNS will be described with reference to the image processing device 101 to the image processing device 103 and the network relay 108 on the first subnet 105. FIG. 4 is a sequence diagram of device registration using a mDNS. By using a mDNS, the image processing device 101 determines the device name of its own device without duplicating the DNS names of other devices (image processing device 102 and image processing device 103) on the first subnet 105.

First, in step 401, the image processing device 101 specifies a destination as a multicast to the network relay 108, and transmits a DNS query for requesting a DNS name. In step 402, the network relay 108 that has received the DNS query from the image processing device 101 transmits the DNS query to all the devices in the same network as the image processing device 101. Specifically, the DNS query for inquiring a device name is transmitted to each of the image processing device 102 and the image processing device 103 on the first subnet 105.

In steps S403 and S404, the image processing device 102 and the image processing device 103 that have received the DNS query transmit a response for the DNS query via the network relay 108. Specifically, in step 403, the image processing device 102 and the image processing device 103 respectively respond to the network relay 108 with information that describes the DNS names (device names) of their own devices. In step S404, the network relay 108 transmits the DNS names received from each of the image processing device 102 and the image processing device 103 to the image processing device 101. For example, the image processing device 102 responds "Device 1" as the DNS name and the image processing device 103 responds "Device 2" as the DNS name. In addition to the DNS name, other information such as an IP address may be included as a response for the DNS query.

In step S405, the image processing device 101 determines the DNS name of its own device. In determining the DNS name, the image processing device 101 determines the DNS name of its own device so as not to duplicate the DNS names of other devices. Specifically, the image processing device 101 compares all the DNS names received in step 404 with the DNS name of its own device. As the result of this comparison, if the DNS name of its own device does not match any other DNS names, the image processing device 101 determines this DNS name as the DNS name of the image processing device 101. As the result of this comparison, when the DNS name of its own device matches the DNS name of another device, the image processing device 101 automatically sets a different DNS name. Then, the image processing device 101 compares the DNS name that has been automatically set with the DNS names of the other devices. By repeating the comparison of the DNS name of its own device with the DNS names of other devices and the automatic setting of a different DNS name until the DNS name of its own device does not match the DNS names of another device, the duplication of DNS names within the local area network can be avoided.

In step 406, the image processing device 101 that has determined the DNS name of its own device provides a notification about the DNS name of its own device determined in step 405 by multicast to the image processing device 102 and the image processing device 103. By the mDNS processing described above, the DNS name can be determined within the local area network while avoiding the duplication of the DNS name.

Figure 5:
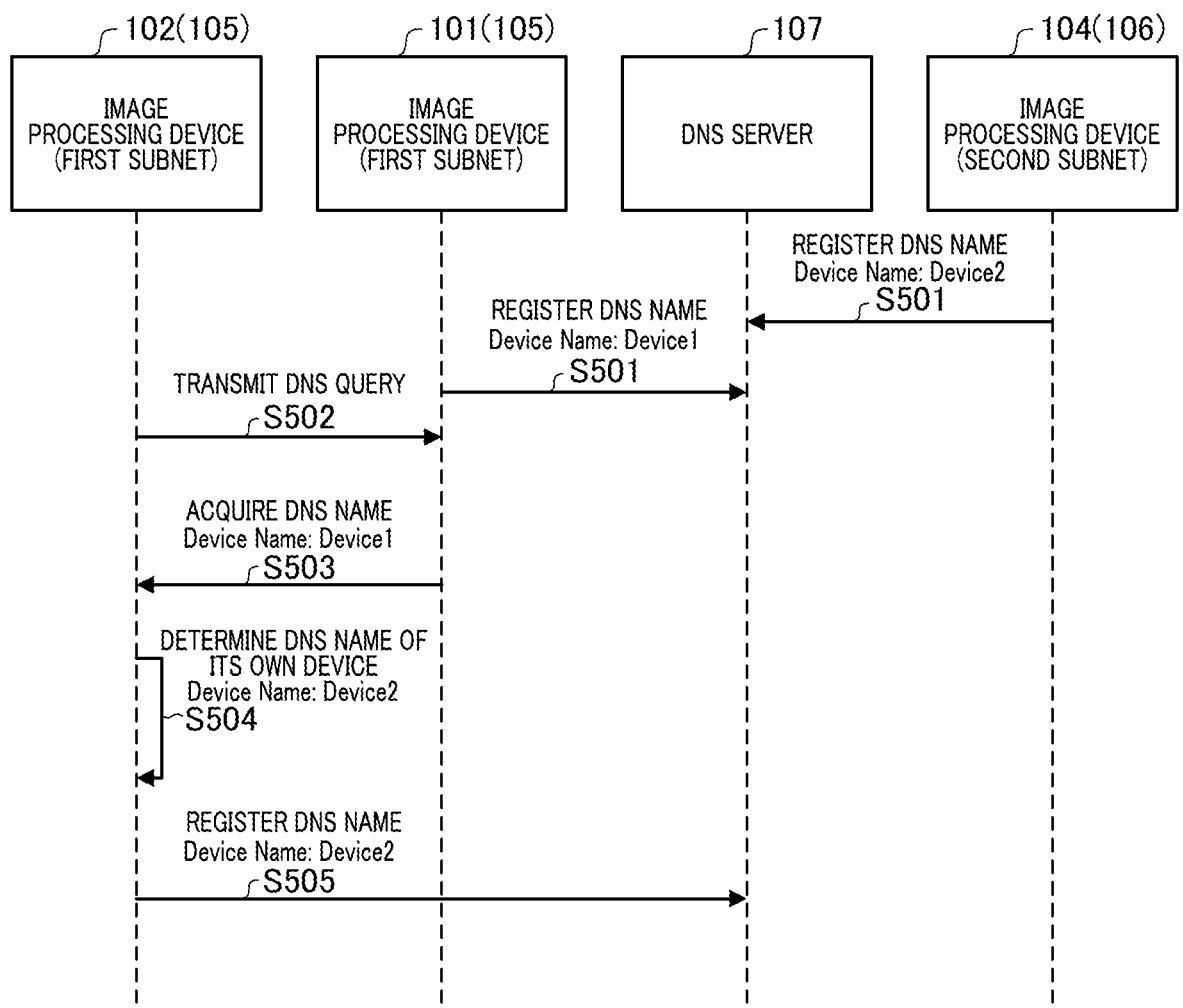
FIG. 5 is a sequence diagram of device registration using mDNS in a case in which a device outside a subnet exists.

When the DNS server is not provided with a duplication guard, the duplication of the DNS name and the DNS name of a device outside of the local area network (subnet) is a concern. An example in which DNS names are duplicated will be described with reference to FIG. 5 and FIG. 6. FIG. 5 is a sequence diagram of device registration using mDNS in the case in which a device outside the subnet exists. This shows an example in which the duplication of the DNS name of the image processing device 101 and the DNS name of the device outside the subnet occurs when the DNS server is not provided with a duplication guard, in a sequence in which the image processing device 101 performs name registration in the DNS server 107 by using mDNS.

An example in which the image processing device 102 newly registers a DNS name will be described. It is assumed that the image processing device 101 exists within the subnet (first subnet 105) that is the same subnet in which the image processing device 102 exists, and the image processing device 104 exists within the subnet (the second subnet 106) that is different from the subnet where the image processing device 102 exists. It is assumed in step 501 that the image processing device 101 and the image processing device 104 have registered the DNS names of their own devices in the DNS server 107 in advance. For example, the image processing device 101 registers "Device 1" as the DNS name, and the image processing device 104 registers "Device 2" as the DNS name.

In step S502, by using mDNS, the image processing device 102 transmits a DNS query to a device that exists within the same subnet via the network relay 108 (not illustrated in FIG. 5). For example, the image processing device 102 transmits a DNS query to the image processing device 101 existing within the first subnet 105 via the network relay 108. In step 503, the image processing device 101 that has received the DNS query provides a notification about "Device 1", which is the DNS name of its own device to the image processing device 102 via the network relay 108 as a response to the DNS query.

In step S504, the image processing device 102 determines the DNS name of its own device. The method for determining the DNS name is the same as step 405 of FIG. 4. For example, the image processing device 102 determines "Device 2", which is not a duplicate of "Device 1" and which was received in step S503, as the DNS name of its own device. In step S505, the image processing device 102 registers the determined DNS name in the DNS server 107.

Figure 6:
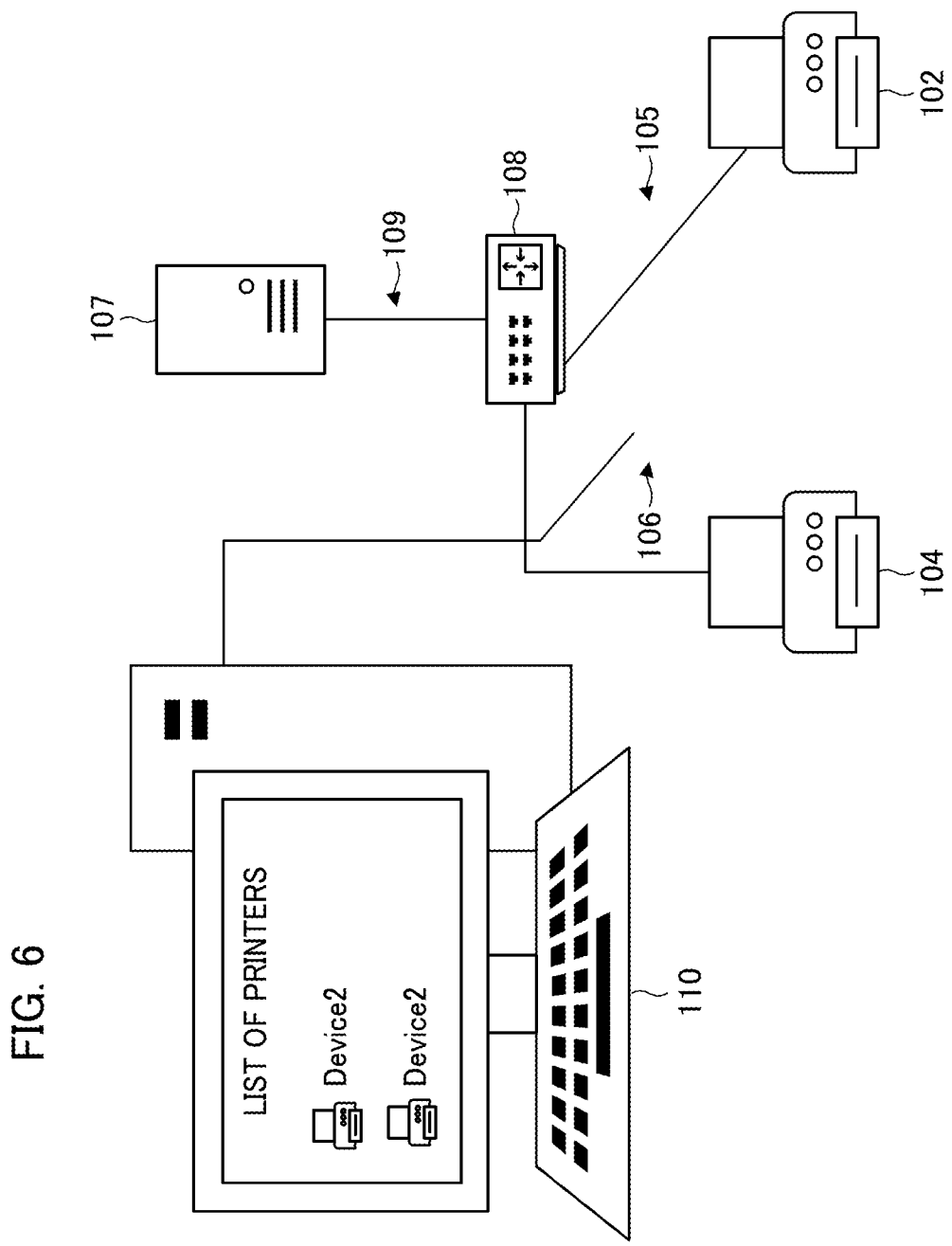
FIG. 6 illustrates an example of the duplication of DNS name.

In the example of FIG. 5, the image processing device 102 and the image processing device 104 both register "Device 2" as their DNS names in the DNS server 107. If the duplicate DNS names are registered in the DNS server 107, the image processing device 101 and the image processing device 104 are displayed with the same name when a user searches for the image processing device, and the user cannot distinguish the image processing device 101 and the image processing device 104. FIG. 6 illustrates an example in which the DNS names of the searched image processing devices are duplicated.

When the user searches for a device for performing print processing from the information processing device 110 by using a DNS-SD capable of searching beyond a local area network, the search is performed beyond the second subnet 106. Hence, "Device 2", which is the device name of the image processing device 104 that exists within the subnet that is the same subnet in which the information processing device 110 exists, and "Device 2", which is the device name of the image processing device 102 that exists within a subnet that is different from the subnet in which the information processing device 110 exists are both displayed as the search results. If the two image processing devices that have the device name "Device 2" are displayed, it becomes difficult for the user to determine which image processing device "Device 2" refers to. As described above, although the duplication of a DNS name within the subnet can be avoided by using mDNS, the duplication of DNS names outside of the subnet cannot be avoided, and when devices within and outside the subnet are searched by using DNS-SD or the like, duplicate DNS names are displayed.

Hence, in the present embodiment, the DNS name is not duplicated not only for a device within the subnet but also for a device outside the subnet. In the present embodiment, first, the image processing device confirms whether or not there is a duplication of the device name for another device within the same subnet, and if there is a duplication, the image processing device changes the device name of its own device to eliminate the duplication. Subsequently, in order to avoid the duplication of the device name with a device name of a device outside of the same subnet, the image processing device acquires a list of device names from the DNS server, compares the list with the name of its own device, and when the image processing device detects a duplication of the device name, it regenerates another DNS name. When the image processing device detects the duplication of the device name of a device outside of the same subnet and regenerates another device name, the duplication of the device name of a device on the same subnet may occur. Therefore, the detection of the duplication of the device name on the local area network is performed by using mDNS again and the elimination of the duplication of the device name is performed. Thus, the duplication of the device names of the devices within and outside of the same subnet can be avoided, and the device name can be registered in the DNS server.

Figure 7:
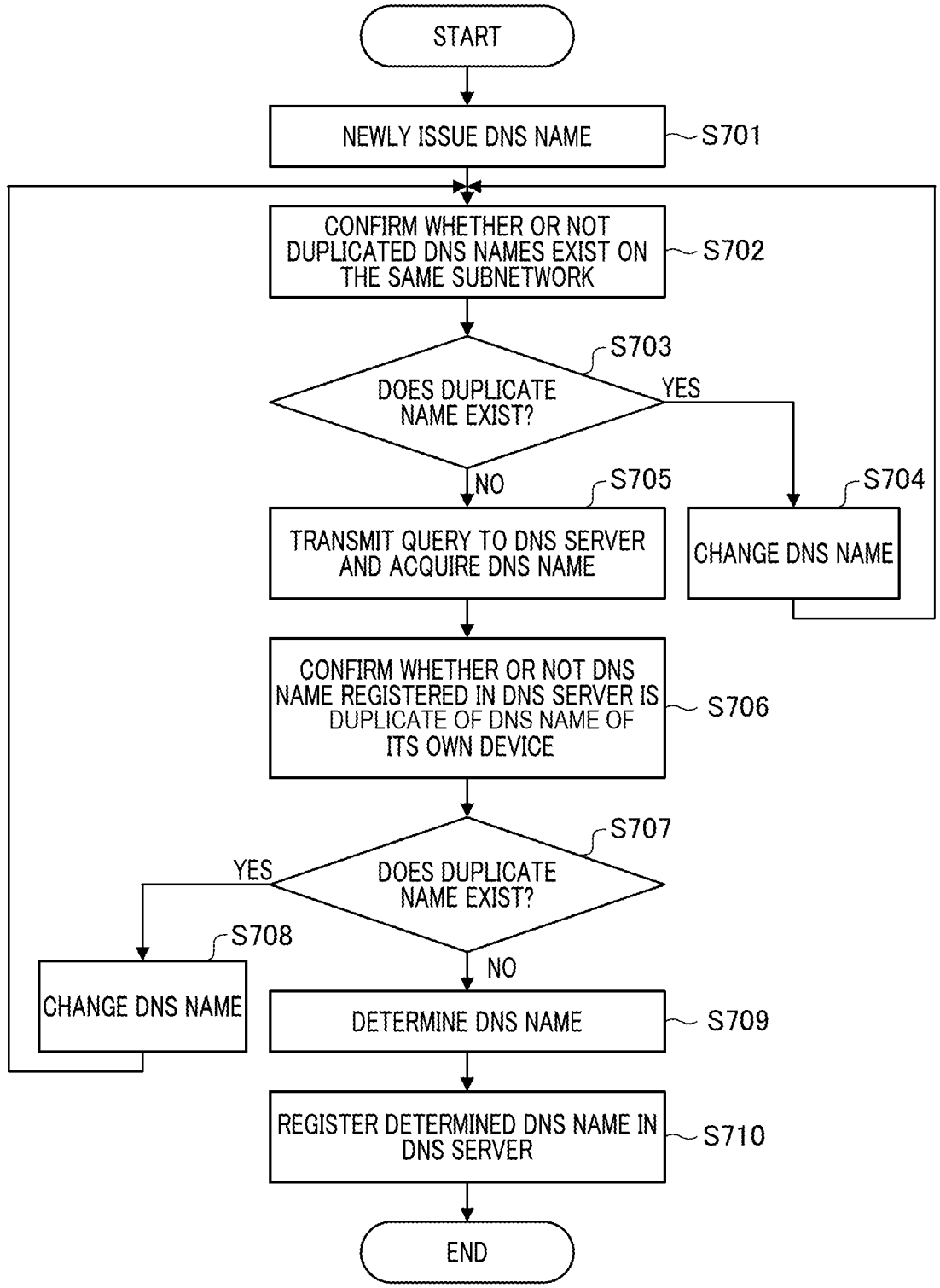
FIG. 7 is a flowchart illustrating device registration processing in which the duplication of DNS name is avoided.

A detailed description will be given of a process for avoiding the duplication of the device name of a device within the same subnet and outside of the subnet and registering a device name in the DNS server with reference to FIG. 7. FIG. 7 is a flowchart illustrating the determination and registration processing of the DNS name in the present embodiment. The process of the image processing device 101 shown in FIG. 7 is realized by deploying a program stored in the ROM 202 or the HDD 204 into the RAM 203 and controlling it by the CPU 201.

First, in step S701, the image processing device 101 newly issues a DNS name (mDNS name, device name) for its own device. In step S702 and step S703, the image processing device 101 confirms whether there are duplicate DNS names within the same subnetwork or not. First, in step S702, the image processing device 101 confirms whether or not there is a DNS name in the first subnet 105 that is the same DNS name issued in step S701, by using name resolution by the multicast (mDNS) described with reference to FIG. 4. In step S401 to step S404 of FIG. 4, the image processing device 101 transmits a DNS query to the devices within the first subnet 105 and acquires the DNS name of each device as a response to the DNS query. Subsequently, in step S703, the image processing device 101 compares the acquired DNS name of each device within the subnet with the DNS name of its own device issued in step S701 and determines whether duplicate DNS names exist or not. If duplicate DNS names do not exist, the process proceeds to step S705. In contrast, if duplicate DNS names exist, the process proceeds to step S704.

If duplicate DNS names exist within the subnet, in step S704, the image processing device 101 changes the DNS name of its own device, which is a duplicate of the DNS name of another device within the subnet. After changing the DNS name, the image processing device 101 returns to step S702 to confirm again whether or not duplicate DNS names exist. By repeating the change of the DNS name until the duplication of the DNS name within the subnet is eliminated, the duplication of the name within the subnet can be avoided. As a specific example of the change of the DNS name, a case in which the DNS name "Device 2" is duplicated will be described. For example, "Device 2 (1)" and "Device 2 (2)", in which a parenthesized number is given after the original DNS name and the number in the parenthesized number is incremented are used to set a new DNS name. When the installation location information set by a user operation performed by an administrator and the like is stored in the HDD 204, the user may attempt to change the DNS name to change by adding the installation location information. For example, when "Kawasaki-16F" is stored as the installation location information, a new DNS name may be set by adding the installation location information after the original DNS name, for example, "Device 2 (Kawasaki-16 F)". In attempting to change the DNS name, the image processing device 101 attempts to change the DNS name so that the user using the image processing device can easily recognize the DNS name at a glance, for example, by adding the installation location information. In contrast, when the DNS names are duplicated even if the installation location information is added, or when the installation location information has not been registered, the image processing device 101 attempts to set the DNS name by incrementing the number in parentheses.

When duplicated DNS names do not exist within the subnet, in step S705, the image processing device 101 acquires the DNS name registered in the DNS server 107. That is, in step S705, the image processing device 101 confirms whether or not the DNS name of its own device is a duplicate of the DNS name of a device outside of the subnet. First, the image processing device 101 transmits a query requesting a DNS name to the DNS server 107. The query transmitted at this time may request all the DNS names registered in the DNS server 107 or may request the DNS name that is the same as the DNS name of its own device.

When the image processing device 101 transmits a query requesting all the DNS names to the DNS server 107, the DNS server 107 transmits all the DNS names registered in the DNS server 107 to the image processing device 101 as a response for the query. Subsequently, the image processing device 101 acquires all DNS names registered in the DNS server 107 from the DNS server 107 as a response to the query.

When the image processing device 101 transmits a query requesting the DNS name that is the same as the DNS name of its own device to the DNS server 107 and the same DNS name as the designated DNS name exists, the DNS server 107 returns, for example, an error to the image processing device 101. Alternately, the DNS server 107 may transmit a record (for example, an SRV record) containing the duplicate DNS name to the image processing device 101, instead of returning an error.

In step S707, the image processing device 101 compares the DNS name that has been acquired in step S705 and registered in the DNS server 107 with the DNS name of its own device determined in step S701 or step S704, and confirms whether or not duplicate DNS names exist. If duplicate DNS names do not exist, the process proceeds to step S709. In contrast, if duplicate DNS names exist, the process proceeds to step S708.

If a duplicate DNS name exists outside of the subnet, in step 708, the image processing device 101 changes the DNS name of its own device, which is duplicated with the DNS name of another device outside the subnet. After changing the DNS name, the image processing device 101 returns to step S702 and confirms again whether or not there is a duplicate DNS name within the subnet. If the image processing device 101 confirms that there is no duplicate DNS name within the subnet, the process proceeds to step S705 and the image processing device 101 confirms whether or not there is a duplicate DNS name outside of the subnet. If all the DNS names are acquired from the DNS server 107 in step S705 and then the step S705 is performed again, it is sufficient to compare the acquired DNS names, and it is not necessary to transmit a query requesting the DNS server 107 to provide the DNS names again. By repeating the change of the DNS name until the duplication of the DNS name within the subnet and outside of the subnet is eliminated, the duplication of the name within and outside of the subnet can be avoided.

If a duplicate DNS name does not exist within or outside of the subnet, in step S709, the image processing device 101 determines the current DNS name as the DNS name of its own device. In step S710, the image processing device 101 registers the DNS name determined in step S709 in the DNS server 107. Specifically, the image processing device 101 generates various records based on the DNS name determined in step S709, and transmits the generated record to the DNS server 107, and the DNS name is thereby registered in the DNS server 107. The process then ends.

According to this process, a DNS name that is not a duplicate of the DNS names of devices within and outside of the subnet can be registered in the DNS server 107. Thus, for example, when the information processing device 110 searches for an image processing device capable of executing printing, the duplication of device names (DNS names) can be avoided.

The condition for executing the control of the present embodiment by which the duplication of the DNS name beyond the subnet can be avoided may also be limited to the case in which a print framework corresponding to the DNS-SD is effectively set. This process may be executed, for example, when, in the image processing device, the operation setting is made to permit the use of printing functions using a print framework using mDNS, which enables wireless printing and like without installing separate drivers. The print framework using mDNS is, for example, Mopria or AirPrint. Mopria is provided to Android and AirPrint is provided to iOS. This process is executed, for example, when an operation setting is made to permit the use of an AirPrint function for receiving print data from a client corresponding to AirPrint and printing the print data and a Mopria function for receiving print data from a client corresponding to Mopria and printing the print data. In contrast, if a setting is made to not permit the use of the print framework corresponding to DNS-SD (for example, if an operation setting is made to not permit the use of the AirPrint function and the Mopria function), control is performed so that this process is not executed. Whether the image processing device should be disclosed or not to the public beyond the subnet depends on the operational policies of the company or organization. For example, in organizations such as large enterprises, if all the installed image processing devices are registered in a DNS server, many printers will be found, and it is possible that the convenience of searching for an end user will be reduced. In view of this, an operation setting for whether or not the DNS-SD function is to be used may be provided as an operation setting of the image processing device. The operation setting is performed by an operation by a user, for example, a manager, and stored in the HDD 204. The image processing device executes the control of the present embodiment when it reads the operation setting stored in the HDD 204 and determines that the operation setting using the DNS-SD function has been made. The operation setting using the DNS-SD function is an operation setting for permitting the use of a print function for receiving print data from a print client capable of searching for an image processing device beyond a local area network using a DNS server and printing it. If the image processing device determines that the operation setting for using the DNS-SD function has not been made, the image processing device performs control so as to not perform the process for registering the DNS names in the DNS server (step S610). By this control, the registration of the DNS names in the DNS server 107 is avoided when the DNS-SD is not used, and it is possible to avoid the duplication of the DNS names the other image processing devices that have been registered in the DNS server 107 or the image processing devices within the same subnet.

As described above, according to the present embodiment, it is possible to avoid the registration of duplicate DNS names (device names) in the DNS server by repeating the check of duplicate DNS names within and outside of the subnet.

OTHER EMBODIMENTS

Embodiment(s) of the present invention can also be realized by a computer of a system or device that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or device by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-192604, filed Nov. 19, 2020, which is hereby incorporated by reference herein in its entirety.

What is claimed is:

1. An information processing device communicable with to a DNS server via a network, the information processing device comprising:
   at least one memory storing instructions; and
   one or more processors configured to execute the instructions to:
      confirm whether or not a device name of the information processing device is a duplicate of:
         any of one or more first device names of one or more first devices in a first local area network to which the information processing device is connected; and
         any of one or more second device names of one or more second devices in a second local network, which is different from the first local area network, registered in the DNS server; and
      register the device name of the information processing device in the DNS server, in a state where the device name of the information processing device has been confirmed to be not a duplicate of:
         any of the one or more first device names of the one or more first devices in the first local network; and
         any of the one or more second device names of the one or more second devices in the second local area network registered in the DNS server.

2. The information processing device according to claim 1, wherein:
   the one or more processors execute the instructions to change the device name of the information processing device in a state where the device name of the information processing device has been confirmed to be a duplicate of any of the one or more first device names of the one or more first devices in the first local area network, and
   in a state where the device name of the information processing device is changed, the one or more processors confirm whether or not the device name of the information processing device is a duplicate of any of the one or more first device names of the one or more first devices in the first local area network.

3. The information processing device according to claim 1, wherein:
   the one or more processors execute the instructions to change the device name of the information processing device in a state where the device name of the information processing device has been confirmed to be a duplicate of any of the one or more second device names of the one or more second devices in the second local area network registered in the DNS server, and
   in a state where the device name of the information processing device is changed, the one or more processors confirm whether or not the device name of the information processing device is a duplicate of any of the one or more first device names of the one or more first devices in the first local area network.

4. The information processing device according to claim 1, wherein the one or more processors, during the confirmation of whether or not the device name of the information processing device is a duplicate of any of the one or more first device names of the one of more first devices in the first local area network:
   acquire the one or more first device names from the one or more first devices in the first local area network using a mDNS (Multicast DNS); and
   compare the acquired one or more first device names with the device name of the information processing device to confirm whether or not a duplicate of the device name of the information processing device exists.

5. The information processing device according to claim 1, wherein the one or more processors, during the confirmation of whether or not the device name of the information processing device is a duplicate of any of the one or more second device names of the one or more devices in the second local network registered in the DNS server:
   request the DNS server to provide all the device names registered in the DNS server; and
   compare all the device names acquired from the DNS server with the device name of the information processing device in response to the request.

6. The information processing device according to claim 1, wherein the one or more processors, during the confirmation of whether or not the device name of the information processing device is a duplicate of any of the one or more second device names of the one or more second device in the second local network registered in the DNS server:
   request the DNS server to provide a duplicate device name that is the same as the device name of the information processing device; and
   in a state where the duplicate device name that is the same as the device name of the information processing device is returned from the DNS server in response to the request, determine that a duplicate of the device name of the information processing device exists.

7. The information processing device according to claim 1, wherein the information processing device is a printing apparatus including a printing function.

8. The information processing device according to claim 7, wherein, in a state where an operation setting of the information processing device is made to permit the use of a printing function for receiving print data from a print client capable of searching for a printing apparatus beyond a local area network using the DNS server and printing the print data, the one or more processors register the device name of the information processing device.

9. The information processing device according to claim 1, wherein the information processing device is a scanner apparatus.

10. The information processing device according to claim 1, wherein the one or more processors confirm whether or not the device name of the information processing device is a duplicate of any of the one or more second device names of the one or more second devices in the second local area network registered in the DNS server, in a state where the device name of the information processing device has been confirmed to be not a duplicate of any of the one or more first device names of the one or more first devices in the first local area network.

11. A control method for an information processing device communicable with a DNS server via a network, the method comprising:
- confirming whether or not a device name of the information processing device is a duplicate of any of one or more first device names of one or more first devices in a first local area network to which the information processing is connected;
- confirming whether or not the device name of the information processing device is a duplicate of any of one or more second device names of one or more second devices in a second local network, which is different from the first local area network, registered in the DNS server; and
- registering the device name of the information processing device in the DNS server, in a state where the device name of the information processing device has been confirmed to be not a duplicate of:
  - any of the one or more first device names of the one or more first devices in the first local network; and
  - any of the one or more second device names of the one or more second devices in the second local area network registered in the DNS server.

12. A non-transitory storage medium storing a computer program executable by a computer of an information processing device communicable with a DNS server via network to execute a method comprising:
- confirming whether or not a device name of the information processing device is a duplicate of any of one or more first device names of one or more first devices in a first local area network to which the information processing is connected;
- confirming whether or not the device name of the information processing device is a duplicate of any of one or more second device names of one or more second devices in a second local network, which is different from the first local area network, registered in the DNS server; and
- registering the device name of the information processing device in the DNS server, in a state where the device name of the information processing device has been confirmed to be not a duplicate of:
  - any of the one or more first device names of the one or more first devices in the first local network; and
  - any of the one or more second device names of the one or more second devices in the second local area network registered in the DNS server.

* * * * *